United States Patent [19]

Sanders

[11] Patent Number: 4,852,408

[45] Date of Patent: Aug. 1, 1989

[54] STOP FOR INTEGRATED CIRCUIT DIAPHRAGM

[75] Inventor: Gary G. Sanders, Lakewood, Ohio

[73] Assignee: Scott Fetzer Company, Westlake, Ohio

[21] Appl. No.: 92,608

[22] Filed: Sep. 3, 1987

[51] Int. Cl.$^4$ ............................ G01L 7/08; G01L 9/06; G01L 9/12

[52] U.S. Cl. .......................... 73/718; 29/621.1; 73/721; 73/724; 73/727; 338/4; 361/283

[58] Field of Search ................. 73/718, 724, 721, 727, 73/706, 715, 754, DIG. 4; 29/610 SG; 92/103 SD; 361/283; 338/4

[56] References Cited

U.S. PATENT DOCUMENTS

| | | | |
|---|---|---|---|
| 3,397,278 | 8/1968 | Pomerantz | 357/40 |
| 4,080,830 | 3/1978 | Eckstein et al. | 73/719 |
| 4,199,991 | 4/1980 | Kodama | 73/106 |
| 4,295,115 | 10/1981 | Takahashi et al. | 29/610 SG |
| 4,333,350 | 6/1982 | Gibb | 73/715 |
| 4,454,771 | 6/1984 | Shimazoe et al. | 73/862.68 |
| 4,519,255 | 5/1985 | Ishii | 73/727 |
| 4,520,675 | 6/1985 | Ziegler | 73/718 |
| 4,649,363 | 3/1987 | Starr | 338/4 |
| 4,691,575 | 9/1987 | Sonderegger et al. | 73/727 |

*Primary Examiner*—Donald O. Woodiel
*Attorney, Agent, or Firm*—Pearne, Gordon, McCoy & Granger

[57] ABSTRACT

A semiconductor transducer with a diaphragm is constructed utilizing a substrate wherein a first portion of that first face is etched to a planar level to achieve a second portion as a physical stop on this substrate, the physical stop having a planar stop face, a sloping sided cavity is etched into a semiconductor wafer from a first face thereof to form a deformable diaphragm in this semiconductor wafer. The semiconductor wafer is anodically bonded to the substrate planar level, with the physical stop located in the cavity and with the stop face acting to prohibit excess movement of the diaphragm. The foregoing abstract is merely a resume of one general application, is not a complete discussion of all principles of operation or applications, and is not to be construed as a limitation on the scope of the claimed subject matter.

22 Claims, 3 Drawing Sheets

STOP FOR INTEGRATED CIRCUIT DIAPHRAGM

BACKGROUND OF THE INVENTION

Semiconductor transducers have become miniaturized, due to the use of monocrystalline silicon formed as a thin diaphragm which may be deflected. This monocrystalline silicon, on the one hand, is advantageous due to essentially zero hysteresis or nearly perfect elasticity, but, on the other hand, if the elastic limit is exceeded, rupture of the diaphragm ensues and it no longer maintains fluid media isolation or an operative structure. Such silicon diaphragm transducers may be used in pressure transducers, strain gauge transducers, and accelerometers, especially where a mass acts on the diaphragm. However, in all such cases of silicon diaphragm transducers, they are at times subjected to pressures or excursions of the diaphragm in excess of their designed value, which at best may cause a shift in the output, and at worst may permanently deform or rupture the transducer diaphragm. Often, this overpressure is transitory in nature, as a common example, caused by a hammer effect. In particular, differential pressure transducers used to measure fluid flow are susceptible to a one-sided overpressure due to the removal of line pressure from either side of the diaphragm. Pressure transducers have historically used a variety of methods to restrain the excursions of the movable parts to non-catastrophic bounds that will then allow recovery, albeit in many cases with an accuracy shift. Methods in common use or suggested include capsular techniques, e.g., U.S. Pat. No. 4,333,350; isolation diaphragms, e.g., U.S. Pat. No. 4,199,991; and stops or overtravel limits of mechanical, hydrostatic, and pneumatic type, e.g., U.S. Pat. Nos. 4,080,830; 4,295,115; 4,454,771; 4,519,255; 4,520,675; and 4,649,363. Regardless of the overexcursion protection method used, it was necessary to apply it on a unit basis, increasing per-unit cost. It is the objective of this invention to present a method of providing single, on either side, or double-sided mechanical stops for integrated circuit diaphragm transducers that may be economically incorporated at the wafer level of fabrication of hundreds or thousands of individual transducers.

SUMMARY OF THE INVENTION

The problem is solved by a semiconductor transducer comprising, in combination, a semiconductor base having first and second planar parallel faces, a cavity formed in said base from said first face to form a deformable diaphragm unitary with said base, a substrate having a planar surface bonded to said first face of said base, a physical stop integral with and carried by said substrate and positioned in said cavity, and said physical stop having a stop face substantially parallel to and positioned closely adjacent to said diaphragm to be contactable by said diaphragm upon excessive excursion to prevent rupture thereof.

The problem is further solved by the method of forming a semiconductor transducer with a diaphragm, comprising the steps of providing a substrate having a first face, establishing stop and locator means including first etching a portion of said first face of said substrate to a substantially planar level to achieve a second portion as a physical stop on said substrate, said physical stop having a substantially planar stop face and an enlarged base at said planar level, providing a semiconductor base having parallel first and second planar faces, etching a sloping sided cavity into said semiconductor base from said first face thereof to form a deformable diaphragm in said semiconductor base, and bonding said semiconductor base first face to said substrate planar level with said physical stop located in said cavity and with said stop face acting to prohibit excess movement of said diaphragm.

The present invention uses suitably formed physical stops of either glass or silicon placed plane parallel to the diaphragm at a predetermined distance from the diaphragm. The clearance necessary between the diaphragm and the stop can be approximated by calculating the rupture deflection and applying a safety factor. The rupture deflection may be approximated by reference to the classic Timoshenko's plate formulas, as set forth in the volume *Theory of Plates and Shells*. A diameter-to-deflection ratio of 200:1 is typical of a safe clearance for a monocrystalline silicon diaphragm.

When the diaphragm has been deflected sufficiently to engage the physical stop, the stop is subjected almost entirely to compressive forces, which greatly enhances its utility. Due to the nature of susceptibility of a pressure transducer to applied stresses normal to the active portion, or, for piezoresistive types, also including stresses, parallel or angular to the active portion, it is necessary to form the stop substrate from a material that is closely matched to silicon in thermal expansion. Either silicon or certain borosilicate glasses, e.g., Corning Glass Code No. 7740 or No. 7070, satisfies this requirement. It is further necessary to provide a bond between the stop substrate and the active monocrystalline silicon that is rigid, to avoid creepage that induces system errors. Therefore, any polymer or metallic bonding has been found to be not adequate. Anodic field-assisted or electrostatic bonding of silicon to glass or silicon to silicon provides a sufficiently stiff bonding method. This type of bonding is disclosed in the Pomerantz U.S. Pat. No. 3,397,278.

The double-sided stop method will be described, since a single-sided stop is just the application of either half of the double-sided stop.

The diaphragmatic cavity side stop is preformed on a substrate material by etching as a current practice example, and may be made from either glass or silicon. As examples, if a glass substrate is used, the glass may be etched to form the stop. A superior method is to bond a silicon wafer to glass material to form a composite substrate, pattern a plurality of resists on the silicon wafer, and etch this silicon wafer using the glass as the etch stop. This provides a plurality of raised physical stops in those locations not etched. This exposes the original glass surface for subsequent bonding to the silicon transducer structure.

The active surface side stop may be formed by a glass etch into a glass substrate, which is subsequently bonded to the opposite or upper side of the silicon wafer and is the preferred method for a piezoresistive pressure transducer. A silicon preetch into the silicon wafer, in order to establish the diaphragm slightly below the plane of the upper surface of the silicon wafer, is practically necessary for a capacitive pressure transducer for top plate clearance. Since this side uses a shallow etch, it is possible to maintain adequate tolerance and surface quality when etching either the glass or the silicon, due to superior control of dimensions required in capacitance type transducers. Since this upper surface of the silicon wafer is usually metallized and contains the bonding pads for external connection, it would normally preclude bonding. However, the conductors may be diffused or implanted into the silicon as isolated feed-throughs in the area used for bonding. The bonding pad area may be left uncovered, and this may be accomplished by etching the glass area over the bonding pads so that bonding at these locations does not occur. Next, a depth-controlled slice is made just through the glass before dicing. After dicing, the glass over the bonding pads, now without any support, will fall away. Alternatively, the bonding pads may be formed as V-grooves in the silicon or U-channels in the glass that expose the bonding pads but are sealed in the inter-pad spaces. Another method involves using a U-shaped, three-edged bonding area if surface isolation is not required.

DESCRIPTION OF THE PREFERRED EMBODIMENTS

Figure 1:
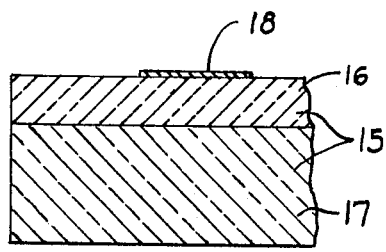
FIG. 1 is a sectional view through a composite substrate of silicon and glass.

FIG. 1 illustrates a composite substrate 15 which is a silicon wafer 16, typically two inches to six inches in diameter, bonded to a glass material substrate of approximately the same size. The silicon wafer is a monocrystalline silicon and the glass material substrate 17 is one having a substantially equal coefficient of expansion, e.g., Corning Glass Code 7740 or 7070. A stiff bond between the wafer and the substrate 17 is required, and anodic or electrostatic bonding has been found to be satisfactory. Hundreds, or even thousands, of individual resists 18 are patterned onto the upper surface of the silicon wafer 16 according to the desired size of the eventual silicon diaphragm transducers desired, and in accordance with the diameter of the wafer 16.

Figure 2:
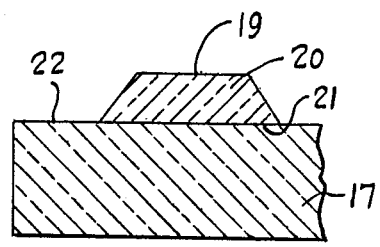
FIG. 2 is a sectional view after the silicon has been etched down to the glass.

FIG. 2 illustrates that the silicon wafer 16 has been etched away to a planar level 22 of the glass 17 at those locations not covered by the resist 18 in accordance with normal integrated circuit manufacturing processes. The resist has been removed in this figure to illustrate a stop face 19 on the physical stop 20, which is secured to the glass substrate 17 at a base 21.

Figure 3:
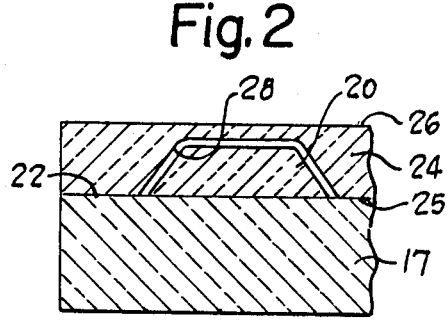
FIG. 3 is a sectional view after a cavity has been etched into a silicon wafer to form a diaphragm at a cavity and the wafer bonded to the glass substrate.

FIG. 3 illustrates the glass substrate 17 and physical stop 20, now with a silicon wafer 24 having first and second faces 25 and 26, respectively. The first face 25 of the wafer 24 is bonded to the planar level face 22 of the glass substrated 17 by anodic bonding. Previously, the silicon wafer would have been patterned with a resist on the first face 25, and then etched to form a plurality of cavities, one such cavity 28 being shown.

Figure 4:
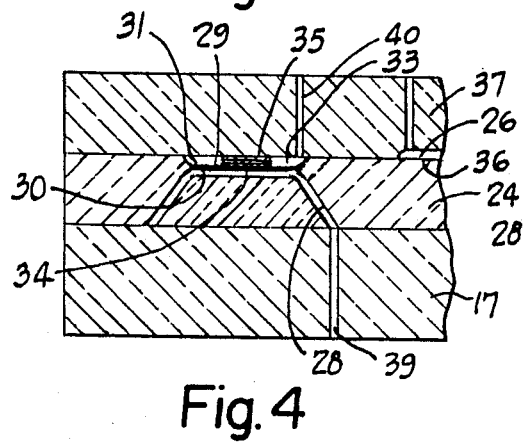
FIG. 4 is a cross-sectional view of the transducer with a second glass substrate bonded at the top.

FIG. 4 illustrates a shallow depression 33 etched in the usual anisotropic manner into the second face 26 to establish a thin diaphragm 29, unitary with the silicon wafer 24, and which diaphragm has an upper face 31 and a lower face 30. At the edges of the diaphragm, at both faces, isotropic etching is used to form a filet for stress relief. A metal capacitor plate 34, less than a micron thick, has been formed on the upper face 31. A second capacitor plate 35 has been formed in a similar manner on a face 36 of a glass substrate 37, which has been anodically bonded to the second face 26 of the silicon wafer 24. Conduits 39 and 40, formed in any suitable manner, lead from the exterior into the cavity 28 and the shallow depression 33, respectively. The silicon wafer 24, as well as the silicon wafer 16, are preferably from bulk <100> silicon, and hence the anisotropic etching angle will be 54 degrees for a truncated cone of each physical stop 20. This etching angle is preserved on both the physical stop and the cavity 28, and this yields minimum cavity volume for prompt response and increases the strength of the physical stop 20. This makes the structure shown in FIG. 4 self-aligning within the tolerance of the gap between the cavity 28 and the physical stop 20.

Figure 5:
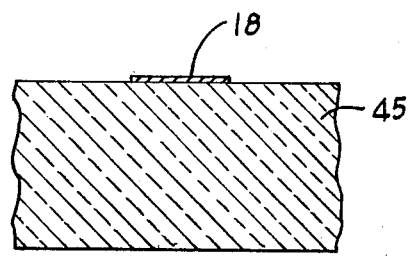
FIG. 5 is a cross-sectional view of a glass substrate.

FIGS. 5 through 8 show another embodiment of the invention with a unitary substrate 45 shown in FIG. 5 with a resist 18 applied in a desired pattern to obtain the individual physical stops. This unitary substrate is preferably of a glass, such as Corning Glass Code 7740 or 7070, which has a thermal expansion similar to that of silicon.

Figure 6:
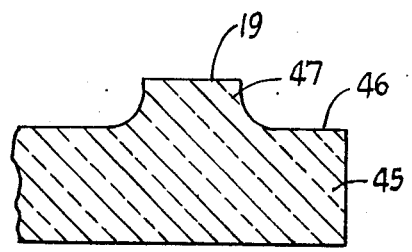
FIG. 6 is a similar sectional view after the glass has been patterned and etched.
Figure 7:
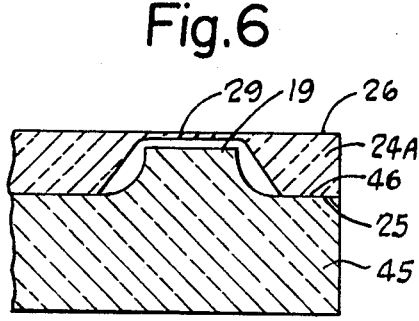
FIG. 7 is a similar cross-sectional view after a silicon wafer has been patterned and etched to form a diaphragm at a cavity and the wafer bonded to the glass substrate.
Figure 8:
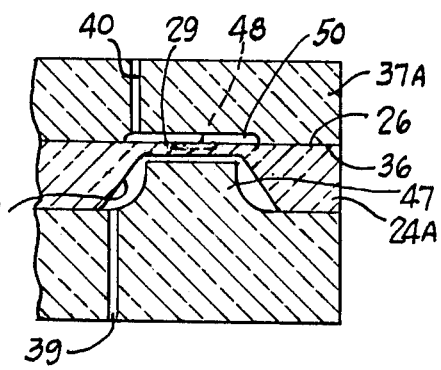
FIG. 8 is a similar cross-sectional view of the unit after an upper glass substrate has been bonded on the silicon wafer.

FIG. 6 shows the substrate 45 after etching to a controlled depth, and with the resist removed. The etching is to a controlled depth to obtain a substantially planar level or face 46 and a physical stop 47 with a planar stop face 19. FIG. 7 shows a silicon wafer 24A having the first and second faces 25 and 26, with the first face 25 bonded to this planar face 46 of the glass substrate 45. Before bonding, the silicon wafer 24A has been patterned and etched to a controlled depth—in this case, a slightly deeper etch than the silicon wafer 24 of FIG. 3. The reason for this is shown in FIG. 8, wherein electrical components 48 are on the diaphragm 29. The electrical components may be a part of a capacitor plate or, as shown, may be implanted piezoresistors. In the usual piezoresistive configuration, these may be four such resistors connected in a Wheatstone bridge.

FIG. 8 also shows a second glass substrate 37A, with a shallow depression 50 immediately over the diaphragm 29. The back wall of this depression will act as a physical stop for upward movement of the diaphragm 29. The glass substrate 37A is bonded at face 36 to the second face 26 of the silicon wafer 24A. Again, this may be by anodic bonding. The conduits 39 and 40 lead to the cavity 28 and the shallow depression 50, respectively, so that differential pressure may be applied to the diaphragm 29 and measured. This method of fabricating the physical stop 47 of FIGS. 5–8 achieves a physical stop face 19 which is the same size as that in the method of FIGS. 1 to 4, and the physical stop 47 is unitary with the glass substrate 45.

Figures 9, 10:
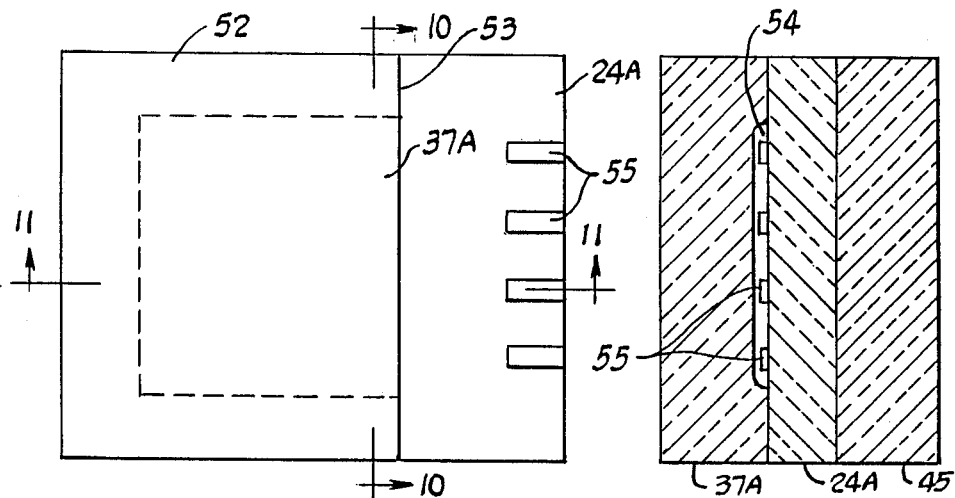
FIG. 9 is a plan view of a U-shaped bonding method.
FIG. 10 is a sectional view on line 10—10 of FIG. 9.
Figure 11:
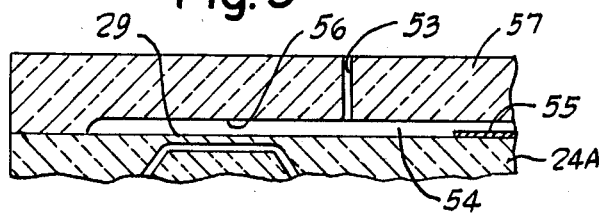
FIG. 11 is a sectional view on line 11—11 of FIG. 9.
Figure 14:
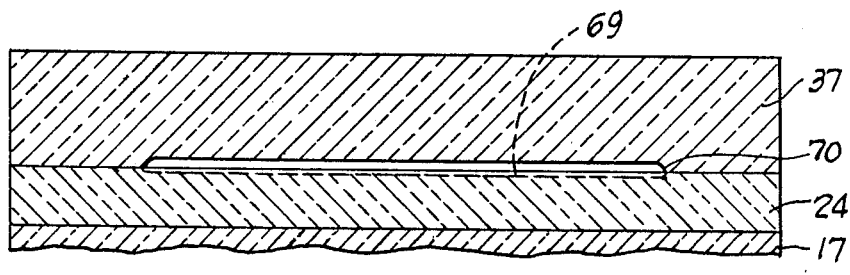
FIG. 14 is a sectional view on line 14—14 of FIG. 12, showing the electronics section.
Figure 15:
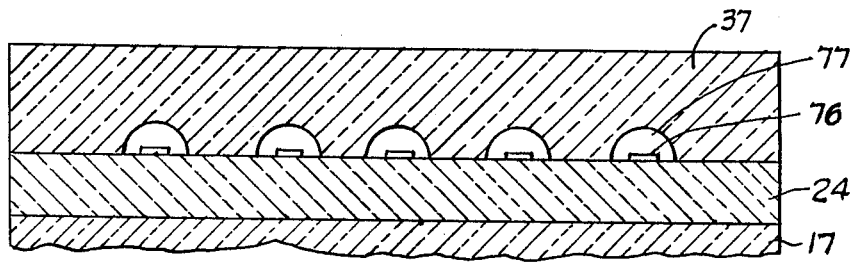
FIG. 15 is a sectional view on line 15—15 of FIG. 12, showing the bonding pad area.

FIGS. 9, 10, and 11 illustrate the bonding of the second substrate 37 to the silicon wafer 24A. The diaphragm 29 is shown in FIG. 11, but is not shown in FIG. 9, which is a plan view looking through the glass substrate 37A to view a U-shaped bonding area 52 which ends at a controlled depth slice 53. This controlled depth slice is shown in FIG. 11 which ends at a shallow depression 54 in the glass substrate 37A. After dicing, the portion 57 of the glass substrate over bonding pads 55 will fall away, since it has no support. The bonding pads 55 may be made by the usual surface metallization and connected in any usual manner to the electrical components on the diaphragm (not shown in FIGS. 9, 10, and 11 but within the area inside the U-shaped bonding area 52). External connection to the bonding pads 55 may be made by individual wire conductors, and where the piezoelectric resistors are used as the electrical components, the internal connections may be formed by surface metallization on the silicon wafer 24A. The wall 56 provides the physical stop on the active surface side, which wall defines the shallow depression 54.

FIG. 11 shows an exaggerated stop clearance to the wall 56 for clarity in the drawings.

Figure 12:
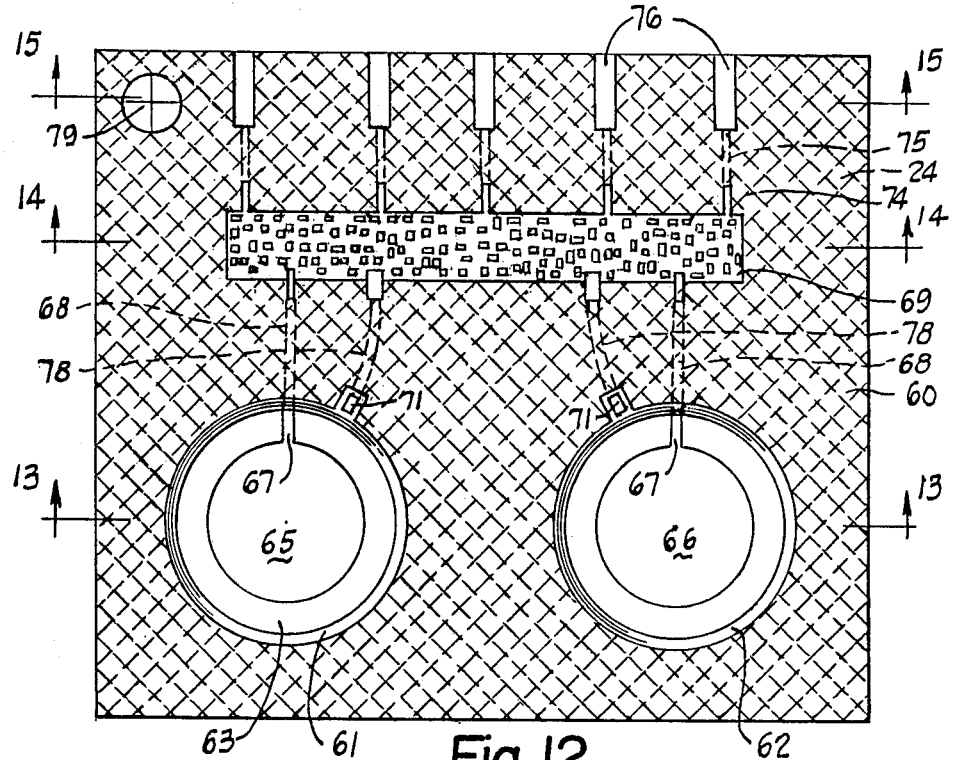
FIG. 12 is a plan view of a capacitive integrated circuit differential pressure transducer.

FIG. 12 refers to another embodiment of a full cover stop on the active surface side. This method is most applicable to capacitive integrated circuit differential pressure transducers, since, by definition, they need an additional layer of some type attached to the active surface onto which is placed the second plate. This FIG. 12 illustrates a fully differential floating twin capacitor integrated circuit such as that disclosed in U.S. Pat. No. 4,625,560. FIG. 12 is a plan view looking through the upper glass substrate 37 and showing a bonding area by a dotted line, double cross-hatch. What is viewed in FIG. 12 is primarily one die of the silicon wafer 24. Sloping walls 61 and 62 define the shallow depressions at which the diaphragm 63 and the reference capacitor plate are located, and in the center of each is a capacitor plate 65 and 66, respectively. This is similar to the shallow depression 33 with diaphragm 29 and capacitor plate 34 shown in FIG. 4. The capacitor plates 65 and 66 may be the usual metallized plates with unitary conductors 67 and isolated, heavy doping, e.g., emitter-doped, conductive paths 68 to an integrated circuit 69 which is isoplanar and formed in an area beneath a shallow depression in the glass substrate 37 caused by sloping walls 70. The conductive paths 68 typically may be emitter diffusion in an isolation well or tub. Bonding pads 71 are provided on the wafer 24 adjacent the respective upper capacitor plates 72 and 73, so that a metallic pressure weld with a metallization tail on the upper glass substrate 37 makes electrical connection from the upper capacitor plate 72 or 73, respectively, on this glass substrate to the bonding pads 71. Conductive paths 78, similar in construction to paths 68, lead from the bonding pads 71 to the integrated circuit 69. Because of the pre-etch establishing the sloping walls 61, 62 and 70, most of the metallization may be applied normally. The pre-etch to establish the sloping walls may be in either the silicon wafer 24 for better control or the glass plate 37 with isoplanar processing and still the normal metallization may be achieved.

The integrated circuit 69 has output terminals 74 which are connected through conductive paths 75 achieved by isolated, heavy doping, e.g., emitter doping, to form these conductive paths 75. These lead to output bonding pads 76, which again may be metallized bonding pads. Such bonding pads may be metallizing V-grooves in the silicon wafer 24, or may be on the flat surface of the silicon wafer and isolated by U-shaped grooves 77 etched into the glass substrate 37. In such case, the external connection may be made by placing an individual wire conductor into each U-shaped groove 77 plus a ball of Indium solder, which will melt at a low temperature and will wet both the metal conductor and the metallized bonding pads 76. The silicon wafer 24 may have an optically visible aligning mark, which usually is a physical feature of an integrated circuit, such as a transistor, or may alternatively be a mark 79, such as that shown in FIG. 12, in order to help the optical alignment of the wafer 24 with the glass substrate 37 and with the glass substrate 17. This aligning or orienting of the parts is aided by the physical stops 20 which are aligned with and fit within the various cavities 28 (see FIGS. 3 and 4).

The processing of the pressure transducer preferably includes the steps of:
(a) completing all of the masking, etching, doping, metallization, etc. necessary on the upper face 26 of the silicon wafer 24;
(b) completing all processing on glass substrates 17 and 37;
(c) electrostatically bonding the upper glass substrate 37 to the upper face 26 of the silicon wafer aligned by the orienting means so there is alignment of metallization, etc.;
(d) mask-to-mask aligning, e.g., using a double-sided aligner, for the diaphragmatic cavity etch into the lower face 25 of the silicon wafer 24; and
(e) electrostatically bonding the lower face 25 onto the substrate 17 with self-alignment of the stops 20 or 47 in the cavities 28, or, more elegantly, optical alignment through the transparent substrate 17 to observable features on the lower face 25.

A semiconductor wafer 24 may be considered a semiconductor base, and the physical stops 20 combined with the alignment mark 79 may be considered stop and locator means for limiting the movement of the diaphragm and for locating the silicon wafer 24 relative to the glass substrate 17.

Figure 13:
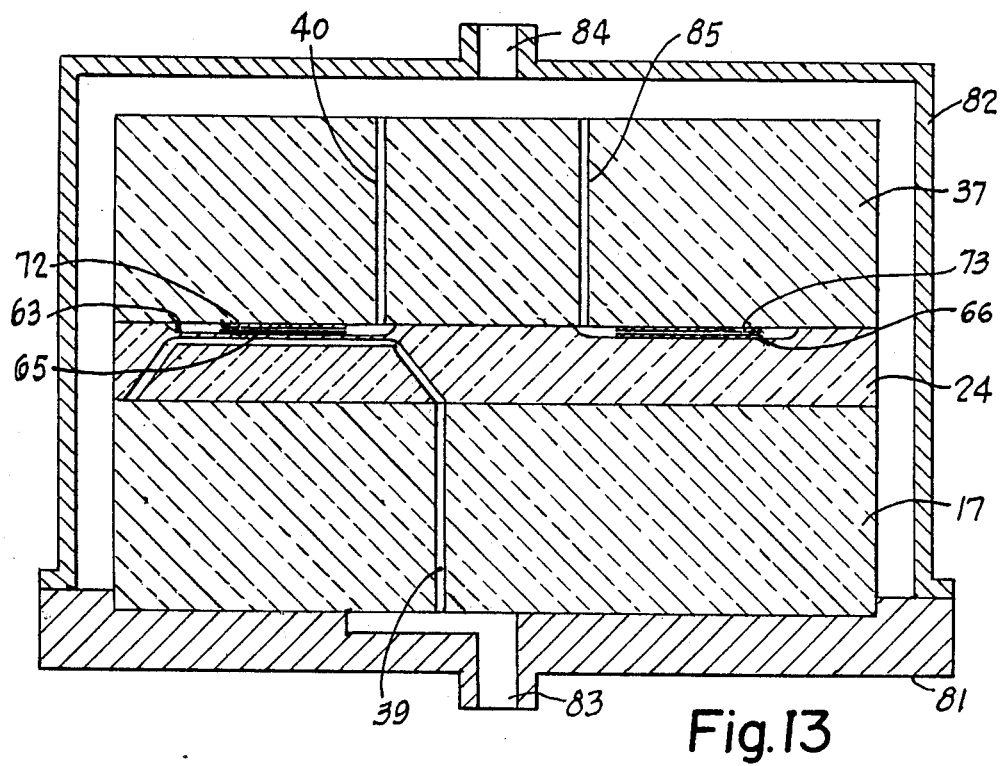
FIG. 13 is a sectional view generally along line 13—13 of FIG. 12 after the pressure transducer is mounted in a housing.

FIG. 13 shows a cross section through the completed capacitive integrated circuit differential pressure transducer when the substrate 17 is sealed to a base 81, such as a metal base, and then a metal can housing 82 is sealed to this base 81. The base has a fluid inlet port 83 and the housing 82 has a fluid inlet port 84. A conduit 85 leads through the glass substrate 37 to the capacitor plate 66 so that this capacitor is subjected to the same temperature, pressure, and dielectric material, e.g., dry or wet gas, as is the capacitor incorporating the plate 65.

The design of the physical stops both above and below the diaphragm is such that the distance between the plates zeroes well before the rupture deflection is reached. The subsequent shorting of the plates when the diaphragm is overstressed upwardly may be sensed and an output as an overpressure signal achieved. Overstressing of the diaphragm in the downward direction is resisted by the flat stop face 19 on the physical stop 20, so the diaphragms are protected in both directions. The plurality of dice on the entire wafer may be processed at the same time so that hundreds, and even thousands, of the pressure transducers may be produced at one time without requiring individual attention to achieve the physical stops both upwardly and downwardly. Since the bonding area 60 surrounds and isolates each section, maintenance of isolated pressure chambers is achieved and essentially hermetic protection for the active electronics 69 exists. The pressure porting is via the apertures 39, 40 and 85 in the glass substrates which, due to their small size, aids in protecting the capacitor plates from particulate contamination. Volumetric displacement from zero to stop is measured in subpicoliters, minimizing the physical time constant and overshooting.

The bonding between the silicon wafer 24 and the glass substrates 17 and 37 is accomplished as a three-layer sandwich, with the outer glass plates being somewhat smaller in diameter than the silicon wafer, which allows the establishment of the necessary electrical fields for the anodic bonding.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A semiconductor transducer comprising, in combination:
   a semiconductor base having first and second planar parallel faces;
   a cavity formed in said base from said first face to form a deformable diaphragm unitary with said base;
   a substrate having a planar surface bonded to said first face of said base;
   a physical stop and locator means integral with and carried by said substrate and positioned in said cavity; and
   said physical stop and locator means having a stop face substantially parallel to and positioned closely adjacent to said diaphragm to be contactable by said diaphragm upon excessive excursion to prevent rupture thereof, and having lateral sides cooperable with the side walls of said cavity for location within the cavity.

2. A transducer as set forth in claim 1, wherein said diaphragm is positioned closely adjacent to said second face.

3. A transducer as set forth in claim 1, wherein said stop face is of a semiconductor of the same type of material as said semiconductor base.

4. A transducer as set forth in claim 3, wherein said cavity has sloping sides determined by a single crystalline structure of said semiconductor base.

5. A transducer as set forth in claim 1 including an integrated circuit formed on said second face of said semiconductor; and
   electrical components on said diaphragm connected to said integrated circuit.

6. A transducer as set forth in claim 1, including an anodic bond between said semiconductor base and said substrate.

7. A transducer as set forth in claim 1, wherein said physical stop and locator means is unitary with said substrate.

8. A transducer as set forth in claim 7, wherein said substrate is a glass material and said physical stop and locator means has curved sides in said cavity.

9. A transducer as set forth in claim 1, wherein said physical stop and locator means has a base mounted on said substrate which is of larger area than said stop face for physical stability of said physical stop and locator means.

10. A transducer as set forth in claim 1, including orienting means for orienting said semiconductor base on said substrate with said physical stop and locator means being a part of said orienting means.

11. A semiconductor transducer comprising, in combination:
    a semiconductor base having first and second planar parallel faces;
    a cavity formed in said base from said first face to form a deformable diaphragm unitary with said base;
    a substrate having a planar surface bonded to said first face of said base;
    a physical stop integral with and carried by said substrate and positioned in said cavity;
    said physical stop having a stop face substantially parallel to and positioned closely adjacent to said diaphragm to be contactable by said diaphragm upon excessive excursion to prevent rupture thereof;
    a second substrate bonded to said second face of said base; and
    a second stop face on said second substrate acting to restrain excessive excursion of said diaphragm in the opposite direction.

12. A transducer as set forth in claim 11, wherein said diaphragm has one surface thereof planar with said second face, and said second stop face is recessed in said second substrate.

13. A transducer as set forth in claim 11, wherein said second substrate is bonded to said second face in a U-shaped area.

14. A transducer as set forth in claim 11, wherein said second substrate is bonded to said second face in an annular area surrounding said diaphragm.

15. A semiconductor transducer comprising, in combination:
    a semiconductor base having first and second planar parallel faces;
    a cavity formed in said base from said first face to form a deformable diaphragm unitary with said base, said cavity having sloping sides determined by a single crystalline structure of said semiconductor base;
    a substrate having a planar surface bonded to said first face of said base;
    a physical stop integral with and carried by said substrate and positioned in said cavity, said physical stop having sloping sides substantially parallel to the sloping sides of said cavity; and
    said physical stop having a stop face substantially parallel to and positioned closely adjacent to said diaphragm to be contactable by said diaphragm upon excessive excursion to prevent rupture thereof.

16. A method of forming a semiconductor transducer with a diaphragm, comprising the steps of:
providing a substrate having a first face;
establishing physical stop and locator means including first etching a first portion of said first face of said substrate to a substantially planar level to achieve a second portion as a physical stop on said substrate;
said physical stop having a substantially planar stop face and an enlarged base at said planar level;
providing a semiconductor base having parallel first and second planar faces;
etching a sloping sided cavity into said semiconductor base from said first face thereof to form a deformable diaphragm in said semiconductor base; and
bonding said semiconductor base first face to said substrate planar level with said physical stop located in said cavity as means to locate said physical stop laterally in said cavity and with said stop face acting to prohibit excess movement of said diaphragm.

17. The method as set forth in claim 16, wherein said substrate is a composite of a semiconductor wafer and a second material adhered together at said planar level; and
said first etching step terminating at the planar level junction of said semiconductor wafer and said second material.

18. The method as set forth in claim 17, wherein said second material is glass.

19. The method as set forth in claim 17, wherein said first and second etching steps result in sloping sides of the physical stop and cavity, respectively.

20. The method as set forth in claim 16, wherein said substrate is a one-piece body and said first etching step is terminated part way through said one-piece body at said planar level.

21. The method as set forth in claim 20, wherein said one-piece body is of a glass material.

22. The method as set forth in claim 20, wherein said first etching step establishes curved sides of said physical stop.

* * * * *